United States Patent [19]

Steiner

[11] Patent Number: 4,869,825

[45] Date of Patent: * Sep. 26, 1989

[54] PROCESS FOR THE REMOVAL OF ORGANIC CONTAMINANTS FROM SOLIDS

[76] Inventor: Werner Steiner, 216 Daniel Low Ter., New York, N.Y. 10301

[*] Notice: The portion of the term of this patent subsequent to Jan. 31, 2006 has been disclaimed.

[21] Appl. No.: 181,943

[22] Filed: Apr. 15, 1988

Related U.S. Application Data

[63] Continuation-in-part of Ser. No. 54,340, May 26, 1987, Pat. No. 4,801,384.

[51] Int. Cl.$^4$ .............................................. B01D 11/04
[52] U.S. Cl. ..................................... 210/634; 134/12; 134/25.1; 134/25.5; 134/26; 134/42; 210/772; 210/908; 210/909
[58] Field of Search ....................... 134/12, 25.1, 25.5, 134/42, 26; 210/634, 747, 768, 772, 805, 908, 909; 570/211; 585/864

[56] References Cited

U.S. PATENT DOCUMENTS

| | | | |
|---|---|---|---|
| 3,899,419 | 8/1975 | Emanuel | 210/642 |
| 3,925,201 | 12/1975 | Ames | 210/766 |
| 4,144,162 | 3/1979 | Edger et al. | 208/13 |
| 4,326,090 | 4/1982 | Smith et al. | 210/757 |
| 4,334,102 | 6/1982 | Decker et al. | 210/634 |
| 4,351,718 | 9/1982 | Brunelle | 208/262 |
| 4,400,552 | 8/1983 | Pytlewski | 568/715 |
| 4,405,448 | 9/1983 | Googin et al. | 210/909 |
| 4,417,977 | 11/1983 | Pythewski et al. | 208/262 |
| 4,421,649 | 12/1983 | Giskehaug et al. | 210/909 |
| 4,422,940 | 12/1983 | Cousino et al. | 210/631 |
| 4,430,208 | 2/1984 | Pytlewski et al. | 208/262 |
| 4,464,351 | 8/1984 | Vasak et al. | 423/486 |
| 4,477,354 | 10/1984 | Fessler et al. | 210/634 |
| 4,483,716 | 11/1984 | Heller | 137/7 |
| 4,501,446 | 2/1985 | Glaser et al. | 210/747 |
| 4,532,028 | 7/1985 | Peterson | 208/262 |
| 4,549,966 | 10/1985 | Beall | 210/661 |
| 4,574,013 | 3/1986 | Peterson | 134/2 |
| 4,595,509 | 6/1986 | Fox et al. | 210/909 |
| 4,606,774 | 8/1986 | Morris | 134/12 |
| 4,662,948 | 5/1987 | Weitzman | 210/909 |

FOREIGN PATENT DOCUMENTS 1517685 4/1972 Fed. Rep. of Germany ...... 210/909

Primary Examiner—Peter Hruskoci
Attorney, Agent, or Firm—Sprung Horn Kramer & Woods

[57] ABSTRACT

A process for the decontamination of materials such as soil, sediments and sludges contaminated with organic contaminants such as PCB's. The process comprises leaching a mixture of solids, water and contaminant in a three step process with solvents to obtain contaminated solvent and water and a mixture of decontaminated solids and solvent. The contaminant is stripped from the contaminated leaching solvent with a stripping solvent to concentrate the contaminants.

10 Claims, 7 Drawing Sheets

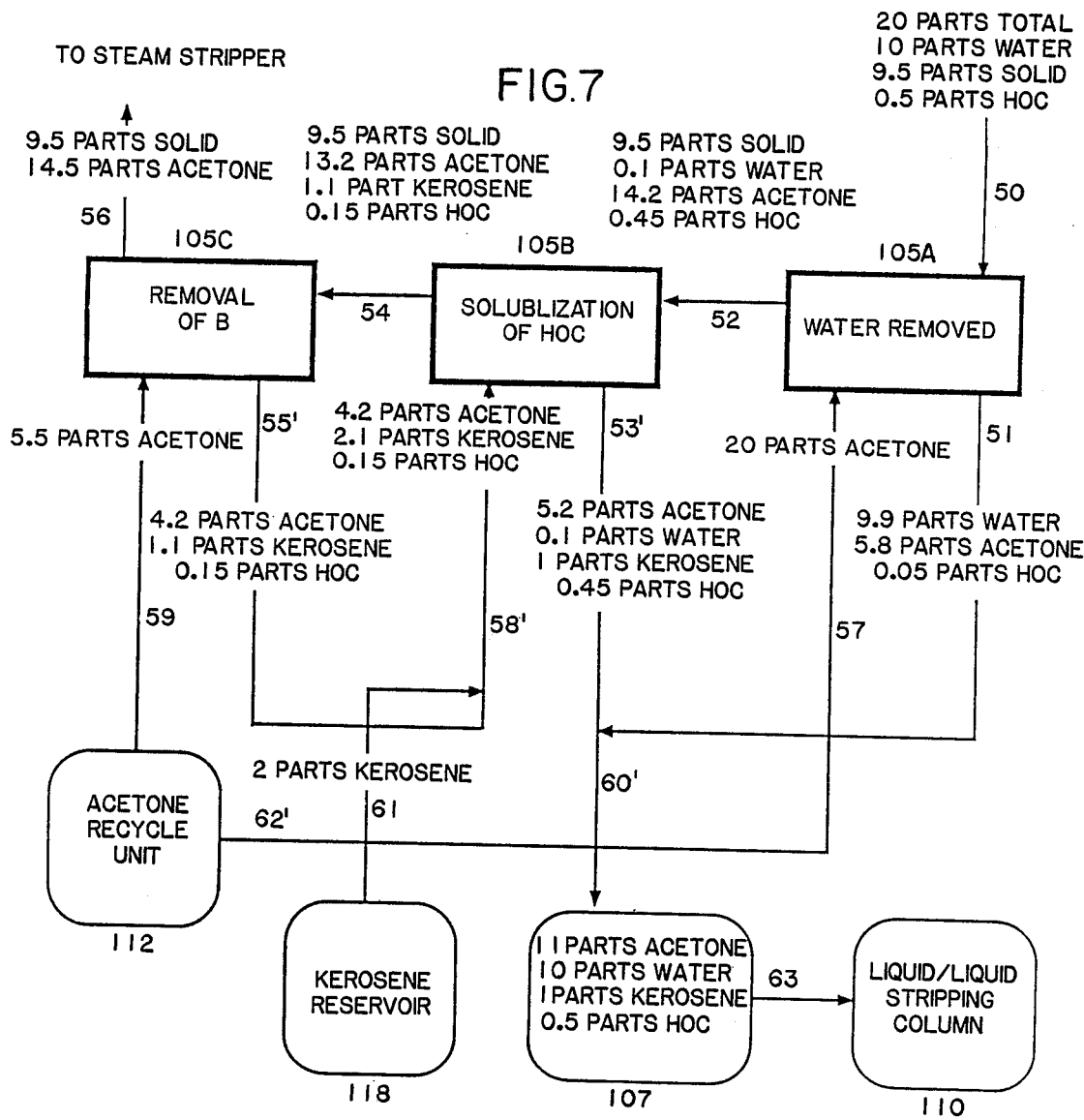

PROCESS FOR THE REMOVAL OF ORGANIC CONTAMINANTS FROM SOLIDS

RELATED APPLICATION

This application is a continuation-in-part application of U.S. application Ser. No. 054,340 filed May 26, 1987 and now Pat. No. 4,801,384.

BACKGROUND OF THE INVENTION

The present invention is directed to the process for the removal of organic contaminants, in particular polychlorinated biphenyls (PCBs), from soil, sediments and sludges. All organic compounds having physico-chemical characteristics similar to PCBs can be removed by this process.

Contamination of sediments and sludges of various harbors, rivers and lagoons throughout the United States with PCBs and other organics is recognized to be a serious environmental problem. Specific PCB contamination sites of particular severity have been identified at Waukegan, IL. and Bedford Harbor, ME., the Hudson river in New York and numerous industrial lagoons. Dredging to decontaminate such harbors/rivers and lagoons is unacceptable until effective disposal/treatment methods for the contaminated sediments become available. The detoxification of such contaminated sediments and sludges at economically acceptable costs presents a serious technological challenge if goals of having no more than 1-5 ppm PCBs in the treated sediments are to be met.

A major problem in the decontamination of soil, sediment and sludges is the high water content often encountered in the environment. This is particularly true if the sediment or sludge has to be dredged from a river basis or a lagoon. Water contents of 80% are not uncommon.

Treatment of PCB contaminated sediments and sludges in an incinerator complying with CFR761.70 is quite energy intensive and costly, if 99.9999 percent destruction and removal efficiencies for the PCBs are to be achieved. Exact costs are difficult to predict because it is uncertain what prices commercial incineration facilities will charge to accept the responsibility of handling such sensitive materials. Current estimates range from $1700 to $2000/m³ if the cost of disposal of residue from incineration are included. Chemical waste landfill disposal costs incurred when the contaminated sediments or sludges are placed in an authorized chemical waste landfill, are less expensive, but present other difficult problems. There exists therefore a very real need for an alternative process technology which is both technically and economically feasible for the cleanup of these PCB contaminated sediments and sludges.

In many cases, soils and sediments are contaminated with more than one type of organic pollutant. For example, PCBs have been used in a wide range of applications as is shown below in Table A.

TABLE A

| Use of PCB Classified to Grade of Aroclor | |
|---|---|
| Current use of PCB | Grade of Aroclor used |
| Electrical capacitors | 1016 (1221, 1254) |
| Electrical transformers | 1242, 1254, 1260 |
| Vacuum pumps | 1248, 1254 |
| Gas-transmission turbines | 1221, 1242 |
| Former use of PCB | |
| Hydraulic fluids | 1232, 1242, 1248, 1254, 1260 |
| Plasticizer in synthetic resins | 1248, 1254, 1260, 1262, 1268 |
| Adhesives | 1221, 1232, 1242, 1248, 1254 |
| Plasticizer in rubbers | 1221, 1232, 1242, 1248, 1254, 1268 |
| Heat transfer systems | 1242 |
| Wax extenders | 1242, 1254, 1268 |
| Dedusting agents | 1254, 1260 |
| Pesticide extenders, inks, lubricants, cutting oils | 1254 |
| Carbonless reproducing paper | 1242 |

Many different fluids, engineered to work with each of these applications, have found their way into the environment. The presence of these various fluids represent a hazard to the environment even if no PCB contamination were evident.

Another environmental pollution issue of enormous proportion stems from underground storage tanks. It has been estimated that there are between 100,000 and 400,000 leaking underground storage tanks in the USA alone containing many types of chemical substances in the class of petroleum hydrocarbons such as auto and aviation gasolines, heating oils and solvents. In addition to these, a large number of chemicals are stored in underground tanks in the U.S. The following Table B is a list representing about 10% of the total number of these chemicals:

TABLE B

Partial List of Chemicals Stored in Underground Storage Tanks in the United States

| | |
|---|---|
| Benzanthracene | Nitropropane |
| Chloronaphthalene | o-Chlorophenol |
| Cresols | PCB (Aroclors) |
| Chrysene | Phenol |
| Dichlorobenzenes | Propylenedichloride |
| Dinitrobenzenes | Tetrachloroethylene |
| Dioxane | Toluene |
| Epichlorohydrin | Trichloroethane |
| Fluoranthene | Trichloroethylene |
| Methylethylketone | Vinylidenechloride |
| Nitrophenols | Xylenes |

For every one of these chemicals, there is an optimum solvent or solvent mixture best suited to remove it from soils or sediments. This solvent is often a non-polar hydrocarbon solvent such as hexane, petroleum ether, kerosene, toluene, xylene or a mixture of these. These solvents however tend to perform very poorly if applied to remove organic pollutants from soils and sediments if even small amounts of water are present. The present invention is directed toward the removal of hydrophobic organic compounds (HOC) such as those mentioned listed above from wet soils, sediments and sludges.

SUMMARY OF THE INVENTION

The main object of the present invention is to provide a process which satisfies the need for cleaning contaminated soil, sediments and sludges and which is both technically and economically feasible.

These and other objects of the present invention are achieved in accordance with the present invention with the process for the decontamination of soil, sediments and sludges contaminated with PCBs and organic compounds having physico-chemical characteristics similar to PCBs, such as pesticides, herbicides, polyhalogenated benzenes, polychlorinated phenols, dioxins, and polynuclear aromatic hydrocarbons which are soluble in acetone or in another low boiling (bp. <100 C.) hydrophilic solvents.

The process in accordance with the present invention is based upon known facts about the properties of PCBs present in soils; sediments and sludges, that is, that the PCBs have a very high partition coefficient between natural sediments and water. The PCB concentration in sediments is on the order of 1000 to 3000 times higher than that in water in the same mixture. The present invention also utilizes the characteristics of particular hydrophilic and hydrophobic solvents, and the application of stripping operations as a final step for isolation and concentration of the contaminants.

The first step of the process takes advantage of the extremely low solubility of PCBs in water and the high affinity for sediment particles. In a typical PCB contaminated sludge or sediment composed primarily of water with, for example, 20% total solids, one could expect virtually all of the PCBs to be associated with the sediment in a water medium. Thus the first processing step is a physical separation of water and solids. This can be accomplished with varying degrees of efficiency using existing equipment. In practice, the solids fraction from this separation will contain on the order of 50% water, but will most likely contain 98%+of the PCB content. The solid fraction and the liquid fraction from the first step require further treatment, however, the first step has managed to isolate most of the PCBs and reduced the sample size by about 60%. The water fraction requires subsequent treatment, which will be addressed later.

This step of the process is applicable to soil, sediment or sludges having a water content from 20% up to 95%, and will be successful with any organic contaminant, which has a partition coefficient (K) between the solid and the liquid fraction of at least 20, whereby the partition coefficient is defined as the ratio of the contaminant concentration in the solid fraction to that in the liquid fraction.

In the second step of the process, the PCB must disassociate themselves from the solid substrate. To do this a water miscible solvent (hydrophilic) such as acetone, is added in quantities sufficient to break the bond between the PCBs and the solid surface. This is followed by another liquid/solid separation. This description is for one stage of the proposed second step of the process.

The use of a hydrophilic solvent was made possible by the removal of the bulk of the water in the first step. The amount of PCB transferred to the solvent/water mixture depends on the stage efficiency, which in turn depends on the partition coefficient between the solid phase and the leaching solvent and the mass ratio of solvent to solids. For optimal performance the mass ratio of solvent to solids should have a value in the range of 1 to 15, preferably 1 to 10 and most preferably 4 to 7.

Knowing the stage efficiency, one can then predict the number of stages required to perform a particular level of separation, given the original contamination level and the allowable level in the solid effluent. This second step is a multistage counter-current leaching using a hydrophilic solvent, or a mixture of two or several solvents from the family of solvents which have the following characteristics:

The hydrophilic solvent must be completely miscible with water and should have a boiling point in the range of 40° C. to 95° C. at atmospheric pressure. If the solvent forms an azeotropic mixture with water then the azeotrop should have a water content of less than 30%. The solvent—even when it contains up to 20% water —should allow for a reasonably fast settling rate of the solids to be treated. The settling rate (as defined in Tryebal, pp. 639, 2nd ed., 1968) measured in a cylindrical tube (35 mm wide, 250 mm high) should be equal or higher than 7 mm/min for a slurry concentration (mass of solid/volume of slurry) in the range of 150 to 420 g/l. Examples of such solvents are: acetone, methanol, ethanol, isopropanol; the preferred solvent is acetone. This part of the process would be similar for any organic contaminant, which is soluble in the organic leaching solvent and has a partition coefficient between the solid fraction and the leaching solvent with a value smaller than 5, preferably smaller than 2.

Variations may be required for mixed systems and in particular contaminants with a higher solubility in water than PCB. Once again, the key to the process is the understanding of the importance of partition coefficients. In mixed systems, partitioning can be expected to be a function of how the contaminants interact relative to each other in the presence of water, solvents and the solid fraction.

The products from the second step are: (1) a hydrophilic solvent/water mixture containing nearly all of the PCB contamination which requires further treatment and (2) a PCB free soil/solvent mixture from which the solvent must be recovered and returned to the process cycle with the soil now being decontaminated and ready to be returned to the environment. A small fraction of this clean soil is utilized in an absorption column to extract the trace amounts of PCBs from the water effluent of the first step. An analagous situation would exist were the contaminant something other than PCB.

The third step of the process is a stripping operation in which the PCB containing stream from above is contacted in a liquid-liquid extractor with an hydrophobic solvent and an aqueous salt solution.

The stripping operation is facilitated by adding excess amounts of aqueous salt solution. The salt concentration in the solvent-water mixture can be in the range of 0% to 100% of the saturation value, preferably 50 to 90%, whereby the salt can be any mineral salt with the preferred salt being potassium sulfate. The water to solvent ratio should be in the range of 1 to 10, preferably 1 to 5 and most preferably 1 to 3.5. The addition of an aqueous salt solution reduces the solubility of PCB in the solvent-water mixture from step 2, and thus increases the stage efficiency of the stripping operation.

The hydrophobic solvent should be imiscible with the hydrophilic solvent-water mixture, should have a density of less than 0.9 g/ml, should have a high solubility for the organic contaminant, and when agitated should not emulsify with the hydrophilic solvent-water mixture. The hydrophobic solvent should be selected so that the partition coefficient of the organic contaminant between the hydrophobic and the hydrophilic solvent is equal or greater than 3, preferably greater than 10, and most preferably greater or equal to 20 for the entire range of the ratio of water to hydrophilic solvent. For a given choice of hydrophilic and hydrophobic solvents, this step of the process can be used successfully for any organic contaminant having a partition coefficient, of at least 3, preferably greater than or equal to 10 and most preferably greater than or equal to 20 defined as the ratio of the concentration of the contaminant in the hydrophobic solvent to that in the hydrophilic solvent.

This step is required to separate the PCBs from the aqueous phase which is inconvenient for the final destruction step and also, one can concentrate the PCBs in this step further reducing the volume of contaminated sample required for handling.

The desired volume reduction of the contaminated sample in this step can be achieved by the proper choice of the ratio of leaching to stripping solvent, which should be in the range of 1 to 10, and the appropriate addition of aqueous salt solution. This method of concentrating the contaminated sample has two important advantages. It requires very little energy and because no evaporation of solvent is involved the choice of the hydrophobic solvent is not restricted by vapor pressure considerations. The hydrophobic solvent is one from the family of solvents of the methane series with 6 to 16 carbon atoms per molecule, preferably kerosene and toluene, with kerosene being the most preferred solvent.

The two streams which leave this step are the PCB concentrated in stripping solvent which proceeds to final destruction either by chemical means (KPEG Reagent) or by incineration and the hydrophilic solvent/water mixture containing trace PCBs. The solvent/water mixture goes next to a distillation column in which the solvent is released and returned to the leaching process described in the second step. The aqueous salt solution contaminated with trace amounts of PCB leaving the distillation colunmn is recycled to the front of the stripping process. In this process step, the organic contaminant is concentrated from the hydrophilic to the hydrophobic via a multi-stage stripping operation. Once again, this approach has general applicability, if a clear understanding of the partitioning characteristics of the contaminants are known.

The fourth step of the process is an adsorbtion operation in which the water fraction from the first step is decontaminated by adsorbing the organic contaminant such as PCB on the surface of a portion of cleaned sediment obtained in step 2. The water is contacted with the cleaned sediment and then separated from the now contaminated sediment. This can be a multistage step with this fourth step repeated for each stage. The actual amount of cleaned sediment required in this step depends on the partition coefficient of the contaminant between the solid and the water fraction, the number of stages, and on the desired level of decontamination. The product streams leaving the fourth step are:

(1) contaminated sediment which is returned to the leaching step where it is combined with new untreated sediment from step 1, and (2) decontaminated water, which is ready to be returned to the environment. This step of the process will work successfully with any organic contaminant having a partition coefficient between the solid fraction (soil, sediment and associated materials) and the liquid fraction with a value of equal to or greater than 20, preferably greater than 100 and most preferably greater than 1000.

The advantages of the process in accordance with the present invention are:

exceptionally high recovery of PCBs from contaminated solids, sediments and sludges;

to obtain fully cleaned sediment wherein there is complete removal of residual solvents as well as PCBs;

to obtain a solid and a water fraction which can safely be returned to the environment.

low energy requirements since no energy intensive steps are involved in the solvent extraction operation;

low raw material requirements since there is complete recycling of solvents.

Another main object of the present invention is to provide an improved process which satisfies the need for cleaning contaminated soil, sediments and sludges and which is both technically and economically feasible.

These and other objects of the present invention are achieved in accordance with the present invention with the process for the decontamination of soil, sediments and sludges contaminated with HOC such as PCBs and organic compounds having physico-chemical characteristics similar to PCBs such as pesticides, herbicides, polyhalogenated benzenes, polychlorinated phenols, dioxins and polynuclear aromatic hydrocarbons. The present invention is further directed toward the removal of hydrophobic organic compounds (HOC) from wet soils, sediments and sludges, whereby the HOC are those mentioned in Tables A and B as well as petroleum hydrocarbons such as auto and aviation gasolines, hating oils and solvents.

This invention is an improvement of the foregoing embodiments in that it modifies the leaching step in which a hydrophilic solvent is used in a multistage countercurrent extractor to decontaminate soils and sediments. It is recognized that the hydrophilic solvent may not always be most effective in solubilizing other hydrophobics such as those mentioned above. The best solvent, which is in any cases a non-polar hydrophobic solvent (hexane, petroleum ether, kerosene, toluene, xylene, etc.) cannot be used effectively for the decontamination of wet soils and sludges, unless the water is removed.

In the present invention, the leaching of HOC from contaminated soil, sediment and sludge is achieved in a three-step leaching operation. First the water and some of the HOC is removed with a hydrophilic solvent A. Second, another solvent B is selected which best solubilizes the HOC and is thus hydrophobic. Solvent B works as a cosolvent with solvent A to remove most of the HOC from a the solids. In the third leaching step, residual solvent and traces of HOC in the sediment are removed with the hydrophilic solvent A.

In this improved leaching step the function of the hydrophilic solvent A is different from the original leaching step, in that, in its pure form, the primary function is to remove water, rather than to leach HOC from the solids. The leaching of most of the HOC from the solids is performed with a mixture of solvent A and solvent B, whereby solvent A can be one, or a mixture of several different hydrophilic solvents, and solvent B can be one, or a mixture of several hydrophobic solvents.

The process in accordance with the present invention is based upon known facts about the properties of HOC present in soils; sediments and sludges, that is, that the HOC have a very high partition coefficient between natural sediments and water. The HOC concentration in sediments is on the order of 100 to 3000 times higher than that in water in the same mixture. The present invention also utilizes the characteristics of particular hydrophilic and hydrophobic solvents, and the application of stripping operations as a final step for isolation and concentration of the contaminants.

The first step of the process takes advantage of the extremely low solubility of HOC in water and the high affinity for sediment particles. In a typical HOC contaminated sludge or sediment composed primarily of water with, for example, 20% total solids, one could expect virtually all of the HOC to be associated with the sediment in a water medium. Thus the first processing step is a physical separation of water and solids. This can be accomplished with varying degrees of efficiency using existing equipment. In practice, the solids fraction from this separation will contain on the order of 50% water, but will most likely contain 98%+of the HOC content. The solid fraction and the liquid fraction from the first step require further treatment, however, the first step has managed to isolate most of the HOC and reduced the sample size by about 60%. The water fraction requires subsequent treatment, which will be addressed later.

This step of the process is applicable to soil, sediment or sludges having a water content from 20% up to 95%, and will be successful with any organic contaminant, which has a partition coefficient (K) between the solid and the liquid fraction of at least 20, whereby the partition coefficient is defined as the ratio of the contaminant concentration in the solid fraction to that in the liquid fraction.

In a first step of the leaching process (step 2a) of this embodiment, a hydrophilic solvent A is employed primarily to remove water from the system. Utilizing a multistage approach (either co-, cross- or counter-current), water can be removed to whatever level is deemed necessary to continue the processing. The liquid stream from step 2a will contain water, hydrophilic solvent and some contaminant HOC and will join other streams for further treatment in the liquid/liquid stripping process step. The solid stream from step 2a contains soil plus contaminant HOC not removed by the hydrophilic solvent. The number of stages required to remove the water from the solid will depend on the physical and chemical characteristics of the soil and its particular hydrophilic affinity. Here the stage efficiency will relate to the ability of a particular hydrophilic solvent to remove the water from the soil or sediment. For optimal performance, the mass ratio of solvent to solids should have a value in the range of 0.5 to 15, preferably 0.5 to 10 and most preferably 0.5 to 5.

Knowing the stage efficiency, one can then predict the number of stages required to perform a particular level of water removal, given the original water content and the allowable level in the solid effluent. This step 2a is a multistage countercurrent solvent exchange using a hydrophilic solvent, or a mixture of two or several solvents from the family of solvents which have the following characteristics:

The hydrophilic solvent must be completely miscible with water and should have a boiling point which is equal to or greater than 40° C. at atmospheric pressure. Examples of such solvents are: acetone, methanol, ethanol, isopropanol; the preferred solvent is acetone. Table C lists some of the possible hydrophilic solvents.

TABLE C

| Alcohols | Glycols | Ketones | Amines |
|---|---|---|---|
| Methanol | Ethylene glycol | Acetone | Ehtylene diamine |
| Ethylalcohol | Diethylene glycol | Methyl acetone[1] | |
| Isopropylalcohol | Propylene glycol | Acetonyl acetone | |
| Furfurylalcohol | | | |

| Alcohol-Esters | Alcohol-Amines | Ketone-Alcohols |
|---|---|---|
| Monoacetin | Mono ethanol amine | Diacetone alcohol |
| Diacetin | Diethanol amine | |
| Ethyl lactate | | |
| Isopropyl lactate | | |

| Ether-Glycols | Glycol-Esters |
|---|---|
| Methyl ether of ethylene glycol | Glycol monoacetate |
| Dimethyl ether of ethylene glycol | Diglycol diacetate |
| Ethyl ether of ethylene glycol | |
| Isopropyl ether of ethylene glycol | |
| Butyl ether of ethylene glycol | |
| Methyl ether of diethylene glycol | |
| Ethyl ether of diethylene glycol | |
| Butyl ether of diethylene glycol | |

| Ether-Glycol-Ester | Miscellaneous |
|---|---|
| Methyl ether of ethylene glycol acetate | Dimethyl sulfoxide |
| Diethyl ether of ethylene glycol acetate | 1,4 Dioxane |
| Methyl ether of diethylene glycol acetate | Ethyl alpha hydroxyisobutyrate |
| Ethyl ether of diethylene glycol acetate | Ethylene chlorohydrin |
| | Propylene chlorohydrin |
| | Tetrahydrofuran |

[1] Methyl ketone: composed of acetone 35 to 60%, methanol 20 to 40%, and methyl acetate 20 to 30%.

In the following step of the leaching process (step 2b) a hydrophobic solvent is introduced which is selected for its ability to solubilize the organic contaminant HOC (among other properties) and thus disassociate the HOC from the soil. The hydrophobic solvent is comixed with a predetermined amount of hydrophobic solvent as they are miscible and soluble in each other in the absence of water. Once again, a multistage approach (either co-, cross- or counter- current) is employed. The purpose of this step is to break the bond that exists between the soil and the contaminant HOC. This requires a multisolvent process step since many of the organics mentioned above will resist the hydrophilic solvent alone and the bond between the HOC and the soil will not be broken. The liquid stream leaving step 2b will contain solvent A, solvent B, and most of the organic contaminant HOC. This stream will be added to the liquid effluent from step 2a being sent to a liquid/liquid stripping process step. The solid stream from step 2b will contain soil, both solvents and the organic contaminant HOC.

In selecting the hydrophobic solvent for use in step 2b, two rules must be followed: (1) the solvent has superior solvent affinity for the HOC contaminant and(2) the solvent will be miscible with the hydrophilic solvent A but form two phases upon addition of water. Examples of such solvents would be alkanes, alkenes, cyclic aliphatic hydrocarbons such as the cycloalkanes, cycloalkenes, benzene and the arenes (aliphatic-aromatic hydrocarbons), alkyl halides and aryl halides. Table D lists some of the possible hydrophobic solvents B. Also included in this set of solvents are the various petroleum fractions such as petroleum ether, kerosene and naptha among others. Selection of the particular hydrophobic will be related to the specific contaminated soil being treated.

TABLE D

| ALKANES | ALKENES | CYCLIC ALIPHATIC | ARENES |
|---|---|---|---|
| | | | Benzene |
| Pentane | | Cyclopentane | Toluene |
| Hexane | 1-Hexene | Cyclohexane | o-Xylene |
| Heptane | 1-Heptene | Cycloheptane | m-Xylene |
| Octane | 1-Octene | Cyclooctane | p-Xylene |
| Nonane | 1-Nonene | Methylcyclopentane | Hemimellitene |
| Decane | 1-Decene | cis-1,2-Dimethylcyclopentane | Pseudocumene |
| Undecane | | trans-1,2-Dimethylcyclopentane | Mesitylene |
| Dodecane | | Methylcyclohexane | Prehnitene |
| Tridecane | | Cyclopentene | Isodurene |
| Tetradecane | cis-2-Pentene | 1,3-Cyclopentadiene | Durene |
| Pentadecane | trans-2-Pentene | Cyclohexene | Pentamethyl-benzene |
| Hexadecane | | 1,3-Cyclohexadiene | |
| Heptadecane | 2-Methyl-2-butene | 1,4-Cyclohexadiene | Hexamethyl-benzene |
| Octadecane | 2,3-Dimethyl-2-butene | | |
| Nonadecane | | | Ethylbenzene |
| Eicosane | | | n-Propyl-benzene |
| isohexane | | | |
| 3-Methylpentane | | | Cumene |
| 2,2-Dimethylbutane | | | n-Butyl-benzene |
| 2,3-Dimethylbutane | | | |
| | | | Isobutyl-benzene |
| | | | sec-Butylbenzene |
| | | | tert-Butylbenzene |

| ALKYL CHLORIDES | ARYL HALIDES | MIXED PETROLEUM FRACTIONS |
|---|---|---|
| | Fluorobenzene | Kerosene |
| | Chlorobenzene | Naptha |
| | | Petroleum Ether |
| n-Butyl Chloride | | |
| n-Pentyl Chloride | Fluorotoluene | |
| n-Hexyl Chloride | Chlorotoluene | |
| n-Heptyl Chloride | | |
| n-Octyl Chloride | | |
| Isopropyl Chloride | Difluorobenzene | |
| Isobutyl Chloride | Dichlorobenzene | |
| sec-Butyl Chloride | | |
| tert-Butyl Chloride | | |
| Cyclohexyl | | |
| Allyl Chloride | | |
| Crotyl (chloridebutene) | | |
| Propargyl Chloride | | |
| Benzyl Chloride | | |
| a-Phenylethyl Chloride | | |
| b-Phenylethyl Chloride | | |
| Diphenylmethyl Chloride | | |
| Triphenylmethyl Chloride | | |
| Dichloromethane | | |
| Trichloromethane | | |
| Tetrachloromethane | | |
| 1,1-Dichloroethane | | |
| 1,2-Dichloroethane | | |
| Trichloroethylene | | |
| Tetrachloroethylene | | |
| Freons | | |

The improved leaching step as disclosed herein greatly enhances the versatility of the process, in that it allows for the best possible combination of hydrophilic solvent A and hydrophobic solvent B to remove different types of HOC from different types of soils and sediments. Examples of possible HOC are wood preserving chlorophenols, pesticides, various hydrocarbons and polycyclic aromatic hydrocarbons. Table E lists possible HOC, which can be removed from soil or sediment, with this improved process. Examples of the recommended hydrophobic solvents B, to be used to remove the HOC listed in table E, are those from the groups of alkenes, cycloaliphatics, mixed petroleum fractions, arenes, alkyl chlorides, cyclic aliphatics and aryl chlorides. Table F lists hydrophobic solvents, which are recommended to remove HOC from soils and sediments. It also lists the preferred and the most preferred hydrophobic solvents to be used in this improved leaching step for the removal of HOC from soils and sediments.

TABLE E

WOOD PRESERVING CHLOROPHENOL AND DERIVATIVES

PENTACHLOROPHENOLS
TRICHLOROPHENOLS
CHLOROPHENOLS
POLYCHLORINATED DIBENZOFURANS
POLYCHLORINATED PHENOXYPHENOLS
POLYCHLORINATED DIPHENYLETHERS
POLYCHLORINATED DIBENZODIOXIN

PESTICIDES

LINDANE
DDT
CHLORDANE
DIELDRIN
ALDRIN
ENDRIN
HEPTACHLOR

TABLE E-continued

TOXAPHENE

HYDROCARBONS

HYDRAULIC FLUID
TRANSFORMER OIL
FUEL OIL
JET FUELS
MINERAL OILS
GASOLINE

MISCELLANEOUS POLLUTANTS

PHENOL
CREOSOTE
STYRENE
DIOXIN
RDX (CYCLONITE)
DIETHYLPHTHALATE
DIBENZOFURANS
CHLORINATED CRESOLS
POLYBROMINATED BIPHENYLS
CRESOLS
NITROPROPANE
DINITROBENZENE
DIOXANE
NITROPHENOL

POLYCYCLIC AROMATICS

NAPHTHALENE
PHENANTHRENE
BENZO(A)PYRENE
ANTHRACENE
PYRENE
BENZANTHRACENE
FLUORANTHRENE

MISCELLANEOUS CHLORINATED POLLUTANTS

CHLORONAPHTHALENE
DICHLOROBENZENE
CHLORINATED CRESOL
POLYCHLORINATED BIPHENYLS
CHLORONAPHTHALENE
EPICHLOROHYDRIN
PROPYLENE DICHLORIDE
TETRACHLOROETHYLENE
VINYLIDENE CHLORIDE

TABLE F

| RECOMMENDED SOLVENTS | PREFERRED SOLVENTS | MOST PREFERRED SOLVENTS |
|---|---|---|
| ALKANES | PENTANE | HEXANE |
| PENTANE | HEXANE | HEPTANE |
| HEXANE | HEPTANE | OCTANE |
| HEPTANE | OCTANE | CYCLOHEXANE |
| OCTANE | CYCLOPENTANE | CYCLOHEPTANE |
| NONANE | CYCLOHEXANE | CYCLOOCTANE |
| DECANE | CYCLOHEPTANE | KEROSENE |
| UNDECANE | CYCLOOCTANE | NAPHTHA |
| DODECANE | KEROSENE | PETROLEUM ETHER |
| TRIDECANE | NAPHTHA | BENZENE |
| PENTADECANE | PETROLEUM ETHER | TOLUENE |
|  | BENZENE | XYLENES |
| CYCLIC ALIPHATICS | TOLUENE |  |
| CYCLOPENTANE | XYLENES |  |
| CYCLOHEXANE | DICHLOROMETHANE |  |
| CYCLOHEPTANE | TRICHLOROMETHANE |  |
| CYCLOOCTANE | TETRACHLOROMETHANE |  |
| METHYLCYCLOPENTANE | FREONS |  |
|  | METHYCYCLOHEXANE |  |
| MIXED PETROLEUM FRACTIONS | CHLOROBENZENE |  |
| KEROSENE | CHLOROTOLUENE |  |
| NAPHTHA |  |  |
| PETROLEUM ETHER |  |  |
| ARENES |  |  |
| BENZENE |  |  |
| TOLUENE |  |  |
| XYLENES |  |  |
| ALKYL CHLORIDES |  |  |
| DICHLOROMETHANE |  |  |
| TRICHLOROMETHANE |  |  |
| TETRACHLOROMETHANE |  |  |
| DICHLOROETHANE |  |  |
| FREONS |  |  |
| CYCLIC ALIPHATICS |  |  |
| CYCLOPENTANE |  |  |
| CYCLOHEXANE |  |  |
| CYCLOHEPTANE |  |  |
| CYCLOOCTANE |  |  |
| METHYLCYCLOPENTANE |  |  |
| DIMETHYCYLOPENTANE |  |  |
| METHYCYCLOHEXANE |  |  |
| ARYL CHLORIDES |  |  |
| CHLOROBENZENE |  |  |
| CHLOROTOLUENE |  |  |

In the next step of the leaching process (step 2c) the hydrophilic solvent is used to fully remove residual hydrophobic solvent and traces of HOC from the soil. Once again, a multistage approach (either co-, cross- or counter- current) is used such that the level of removal of HOC and hydrophobic solvent can be predetermined depending on environmental criteria. The liquid stream from step 2c contains hydrophilic solvent, essentially all remaining hydrophobic solvent, and essentially all remaining HOC. This stream will be added to the liquid effluent from steps 2a and 2b being sent to a liquid/liquid stripping process step. The solid stream from step 2c will contain soil and hydrophilic solvent but is now free of all residual HOC and the hydrophobic solvent and is sent to the steam stripper in which the hydrophilic solvent is removed and recovered for recycle while the soil is finally contaminant free and reintroduced to the environment.

The third step of the process is a stripping operation in which the HOC containing stream from above is contacted in a liquid-liquid extractor with more hydrophobic solvent and an aqueous salt solution.

The stripping operation is facilitated by adding excess amounts of aqueous salt solution. The salt concentration in the solvent-water mixture can be in the range of 0% to 100% of the saturation value, preferably 50 to 90%, whereby the salt can be any mineral salt with the preferred salt being potassium sulfate. The water to solvent ratio should be equal to or smaller than 10, preferably equal to or smaller than 5 and most preferably equal to or smaller than 3.5. The addition of an aqueous salt solution reduces the solubility of HOC in the solvent-water mixture from step 2, and thus increases the stage efficiency of the stripping operation.

The hydrophobic solvent should be imiscible with the hydrophilic solvent-water mixture, should have a high solubility for the organic contaminant, and when agitated should not emulsify with the hydrophilic solvent-water mixture. The hydrophobic solvent should be selected so that the partition coefficient of the organic contaminant between the hydrophobic and the hydrophilic solvent is equal or greater than 3, preferably greater than 10, and most preferably greater or equal to 20 for the entire range of the ratio of water to hydrophilic solvent. For a given choice of hyophilic and hydrophobic solvents, this step of the process can be used successfully for any organic contaminant having a partition coefficient, of at least 3, preferably greater than or equal to 10 and most preferably greater than or equal to 20 defined as the ratio of the concentration of the contaminant in the hydrophobic solvent to that in the hydrophilic solvent/water mixture.

This step is required to separate the HOC from the aqueous phase which is inconvenient for the final destruction step and also, one can concentrate the HOC in this step further reducing the volume of contaminated sample required for handling.

The desired volume reduction of the contaminated sample in this step can be achieved by the proper choice of the ratio of leaching to stripping solvent, which should be in the range of 1 to 20, and the appropriate addition of aqueous salt solution. This method of concentrating the contaminated sample has two important advantages. It requires very little energy and because no evaporation of solvent is involved the choice of the hydrophobic solvent is not restricted by vapor pressure considerations. The hydrophobic solvent is the same as solvent B used in the leaching step 2b.

The two streams which leave this step are the HOC concentrated in stripping solvent which proceeds to final destruction (e.g. KPEG Reagent, photochemical oxidation or by incineration) and the hydrophilic solvent/water mixture containing trace HOC. The solvent/water mixture goes next to a distillation column in which the solvent is released and returned to the leaching process described in the second step. The aqueous salt solution contaminated with trace amounts of HOC leaving the distillation column is recycled to the front of the stripping process. In this process step, the organic contaminant is concentrated from the hydrophilic solvent A to the hydrophobic solvent B via a multi-stage stripping operation.

The fourth step of the process is an adsorption operation in which the water fraction from the first step is decontaminated by adsorbing the organic contaminant HOC on the surface of a portion of cleaned soil or sediment obtained in step 2C. The water is contacted with the cleaned soil or sediment and then separated from the now contaminated soil or sediment. This can be a multistage step with this fourth step repeated for each stage. The actual amount of cleaned soil or sediment required in this step depends on the partition coefficient of the contaminant between the solid and the water fraction, the number of stages, and on the desired level of decontamination. The product streams leaving the fourth step are:

(1) contaminated sediment which is returned to the leaching step where it is combined with new untreated sediment from step 1, and (2) decontaminated water, which is ready to be returned to the environment. This step of the process will work successfully with any organic contaminant having a partition coefficient between the solid fraction (soil, sediment and associated materials) and the liquid fraction with a value of equal to or greater than 20, preferably greater than 100 and most preferably greater than 1000.

These and other advantages and objects of the present invention will become clear from the following detailed description taken with the attached drawing, wherein:

BRIEF DESCRIPTION OF THE DRAWING

FIGS. 5–7 are specific examples for the embodiments of FIGS. 2–4 respectively.

DESCRIPTION OF THE INVENTION

Figure 1:
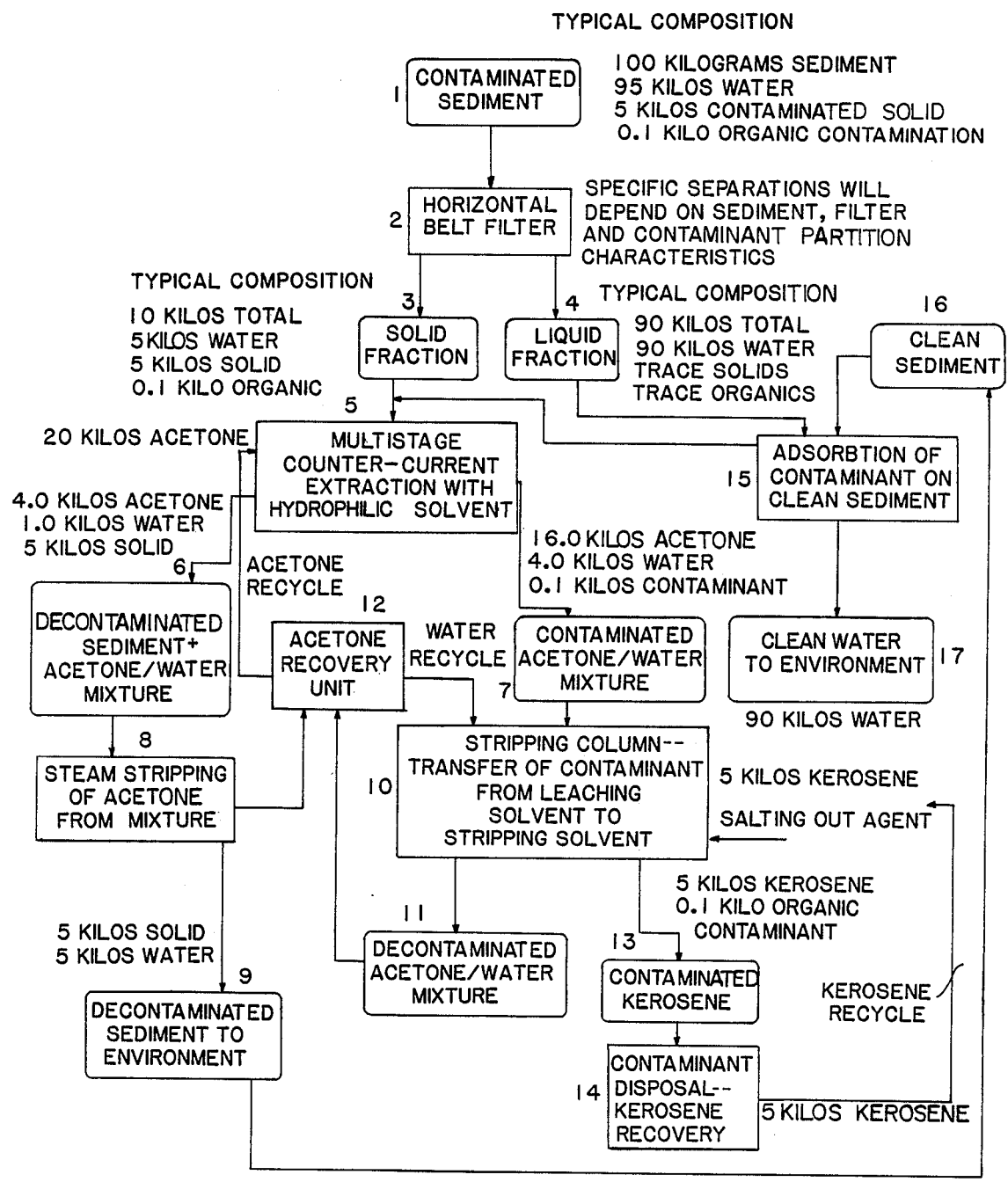
FIG. 1 is a flow chart of the process in accordance with the present invention.

Referring to FIG. 1, in the process, contaminated sediment provided at 1 typically comprises 100 parts (by weight) sediment, including 95 parts contaminated water, 5 parts contaminated solids and 0.1 parts organic contamination. The sediment is fed to a horizontal belt filter at 2 wherein the original composition is broken up into a solid fraction typically containing a total of 10 parts including 5 parts water, 5 parts solid and approximately 0.1 parts organic and a liquid fraction 4 typically comprising 90 parts total weight of which approximately 90 parts is water and the remaining constituents comprising trace solids and trace organics.

The solid fraction is fed in step 5 to a multistage countercurrent extraction process with a hydrophilic solvent typically 20 parts of acetone from acetone recovery unit 12 for the 10 parts of solid fraction. As a result of this extraction, decontaminated sediment and acetone/water mixture are obtained at 6 including typically 4 parts of acetone and approximately 5 parts of solid and a contaminated acetone/water mixture is obtained at 7.

The decontaminated sediment and acetone water mixture is steam stripped of the acetone so that decontaminated sediment which is able to be released to the environment is obtained at 9 and contains approximately 5 parts of solid and 5 parts of water. The stripped acetone is fed to the acetone recovery unit 12 wherein acetone is separated from any remaining water, with acetone being recycled to the multiphase countercurrent extraction unit 5 and the water recycled to a stripping column 10 to be described later.

The contaminated acetone water mixture from 7 is fed to stripping column 10 wherein the contaminant is transferred from the leaching solvent to a stripping solvent, in this instance kerosene. The decontaminated acetone water mixture from the stripping column 10 is received at 11 and acetone and water are separated from each other in the recovery unit 12.

The stripping column receives approximately 5 parts of kerosene for the total 20 parts of materials received from step 7. After the stripping is taking place and the contaminants are concentrated in the stripping solvent, the contaminated kerosene at 13 comprises 5 parts of kerosene and approximately 0.1 parts of organic contaminant. In a contaminant disposal kerosene recovery unit 14, the contaminant is separated from the kerosene so that the kerosene is recycled to the stripping column 10.

The liquid fraction 4 which only contains trace organic contaminants, is fed to 15 where clean sediment is provided so that the contaminant is adsorbed on the clean sediment. At 17 approximately 90 parts of clean water are obtained which can be released to the environment. The clean sediment for 15 can be obtained from clean sediment 16 which is in part recycled from the decontaminated sediment in step 9. Moreover, the contaminated sediment obtained from step 15 can be fed to the multistage counter-current extraction process step 5 so as to decontaminate the sediment.

The initial separation of the liquid in solid fractions at 2 can be by either filtration, centrifugation or by means of a horizontal belt filter system.

The leaching process carried out at 5 can be carried out by the use of a mixer-settler type continuous countercurrent contractor. The liquid extraction carried out in the stripping column 10 can take place in an agitated extraction tower such as a rotating disk unit. The adsorption of the contaminant on clean sediment at 15 can be carried out in a fixed bed adsorbtion column or in a multi-stage mixer-settler.

EXAMPLE

An environmental sediment from Waukegan Harbor (Mich.) containing 82% water was separated by vacuum filtration into a liquid fraction and a wet solid fraction containing 57% water. The PCB concentration of the liquid fraction was determined using EPA-Method 608 and found to be 9 ppm. The wet solid fraction was analyzed by a soxhlet procedure disclosed at Analytical Chemistry, 1985, 57, 2452–2457. The PCB concentration in the solid fraction was 33100 ppm on a dry basis. The calculated partition coefficient was K =3678.

Using the wet solid fraction of Waukegan Harbor sediments and three different solvents: Acetone, Methanol and Isopropanol the leaching step was carried out. The sediment was contaminated with Aroclor 1242.

Amounts of 7.5 g of wet sediment and of 30 ml of solvent were filled in a 50 ml centrifuging tube and sealed off with a screw top. The specimens were agitated for one hour with a wrist action shaker and then centrifuged for 30 minutes at 3000 rpm. The supernate was decanted, vacuum filtrated through a 0.45 $\mu$m organic filter and replaced with new solvent. This procedure - which defines one stage - was repeated four times. The PCBs were then transferred to Methylenechloride by adding 200 ml of a 2% $Na_2SO_4$ aqueous solution to the 30 ml of leachate and performing three successive liquid-liquid extractions with 60 ml of Methylenechloride each. The combined extracts were then dried and cleaned up, following the procedures in method 608 of USEPA and analyzed by gas chromatography. The results are presented in table I.

TABLE I

| SOLVENT | STAGE # | PCB REMOVED/ UNIT MASS OF SOLID (ppm) | RUNNING TOT. OF PCB REMOVED/ UNIT MASS OF SOLID (ppm) | OVERALL LEACHING EFFICIENCY (%) | STAGE EFFICIENCY (%) | PCB-CONC IN SOLID AFTER N-th STAGE ASSUMING ALL PCB ASSOC. WITH SOLID (ppm) |
|---|---|---|---|---|---|---|
| METHANOL | 0th | 0 | 0 | | | 32508 |
| | 1st | 26085 | 26085 | 80.24 | 80.2 | 6424 |
| | 2nd | 5429 | 31514 | 96.94 | 84.5 | 995 |
| | 3rd | 863 | 32376 | 99.59 | 86.7 | 132 |
| | 4th | 114 | 32490 | 99.94 | 86.2 | 18 |
| | *5th | 16 | 32506 | 99.99 | 87.1 | 2 |
| | *6th | 2 | 32508 | 100.00 | | 0 |
| ISOPROPANOL | 0th | 0 | 0 | | | 32914 |
| | 1st | 27537 | 27537 | 83.66 | 83.7 | 5378 |
| | 2nd | 4250 | 31787 | 96.57 | 79.0 | 1128 |
| | 3rd | 844 | 32630 | 99.14 | 74.8 | 284 |
| | 4th | 213 | 32843 | 99.78 | 74.9 | 71 |
| | *5th | 56 | 32900 | 99.96 | 79.0 | 15 |
| | *6th | 15 | 32914 | 100.00 | | 0 |
| ACETONE | 0th | 0 | 0 | | | 33641 |
| | 1st | 27656 | 27656 | 82.21 | 82.2 | 5986 |
| | 2nd | 5376 | 33032 | 98.19 | 89.8 | 610 |
| | 3rd | 527 | 33559 | 99.75 | 86.4 | 83 |
| | 4th | 71 | 33630 | 99.97 | 86.1 | 11 |
| | *5th | 10 | 33640 | 100.00 | 84.6 | 1 |
| | *6th | 1 | 33641 | 100.00 | | 0 |

*THE VALUES FOR THE 5th AND 6th STAGE ARE EXTRAPOLATED VALUES FROM STAGES 1 THROUGH 4.

TABLE II

| AGITATION TIME (hrs) | STAGE # | PCB REMOVED IN THE 1st, 2nd, ... Nth, STAGE PER UNIT MASS OF SOLID (ppm) | TOTAL PCB REMOVED AFTER NO. OF STAGES PER UNIT MASS OF SOLID (ppm) | OVERALL LEACHING EFFICIENCY (%) | STAGE EFFICIENCY (%) | PCB-CONC IN SOLID AFTER N-TH STAGE, ASSUMING ALL PCB ASSOC. WITH SOLID (ppm) |
|---|---|---|---|---|---|---|
| 24 | 0th | | | | | 876 |
| | 1st | 788.0 | 788.0 | 89.91 | 89.9 | 88 |
| | 2nd | 80.7 | 868.7 | 99.12 | 91.3 | 8 |
| | 3rd | 7.1 | 875.8 | 99.92 | 91.4 | 1 |
| | 4th* | 0.6 | 876.4 | 99.99 | 90.0 | 0.1 |
| | 5th* | 0.1 | 876.5 | 100.00 | | 0.0 |
| 6 | 0th | | | | | 935 |
| | 1st | 810.0 | 816.0 | 87.32 | 87.3 | 119 |
| | 2nd | 101.6 | 917.6 | 98.19 | 85.7 | 17 |
| | 3rd | 14.9 | 932.5 | 99.78 | 87.8 | 2 |
| | 4th* | 1.8 | 934.3 | 99.98 | 89.0 | 0.2 |
| | 5th* | 0.2 | 934.5 | 100.00 | | 0.0 |

*THE VALUES FOR THE 4th AND 5th STAGE ARE EXTRAPOLATED FROM STAGES 1 THROUGH 3.

The same procedure was performed with a sediment obtained from Franklin Institute. The contaminant was Aroclor 1260, the solvent used was methanol and the agitation times were six and 24 hours respectively. The results are given in Table II.

In order to carry out the step of stripping, acetone was spiked with PCBs (Aroclor 1242) to a concentration of 444 µg/ml. Aliquotes of this stock solution were mixed with various amounts of kerosene and aqueous $K_2SO_4$ solution. The independent variables were the ratio of water to acetone ($R_A$), the ratio of acetone to kerosene ($R_B$) and the concentration (in mass %) of $K_2SO_4$ in the water-acetone mixture. The dependent variable was the transfer efficiency ($\eta$). The liquids were filled into a glass bottle, which was sealed with a teflon lined screw top, and then agitated for one hour. After allowing 30 minutes for phase separation the kerosene was siphoned off and its PCB-conc. analyzed by gas chromatography. The results in table III show that stage efficiencies of higher than 80% can be achieved.

TABLE III

| Ratio of water to acetone $R_A$ | Ratio of acetone to kerosene $R_B$ | $K_2SO_1$ in water-acetone (mass %) | Transfer efficiency (%) |
|---|---|---|---|
| 3.5 | 4 | 0.2 | 83 |
| 3.5 | 4 | 1.2 | 82 |
| 5 | 4 | 0.2 | 81 |
| 5 | 4 | 1.2 | 83 |

The liquid fraction of the original sediment contains small amounts of PCBs. They are removed by adsorbing them onto a small quantity of the cleaned solid fraction of the sediment.

The step of adsorption was carried out by providing two samples of 150 ml of the liquid fraction, containing 9 ppm of Aroclor 1242. The samples were each mixed with 8.5 g of the PCB-free solid fraction of Waukegan Harbor sediments. The mixture was agitated for 10 minutes. After complete settling of the solids the liquid fraction was decanted and vacuum filtrated with a 0.45 µm filter and analyzed for PCBs using method 608 of USEPA and gas chromatography. The PCB concentration was below detection limit in both samples.

Figure 2:
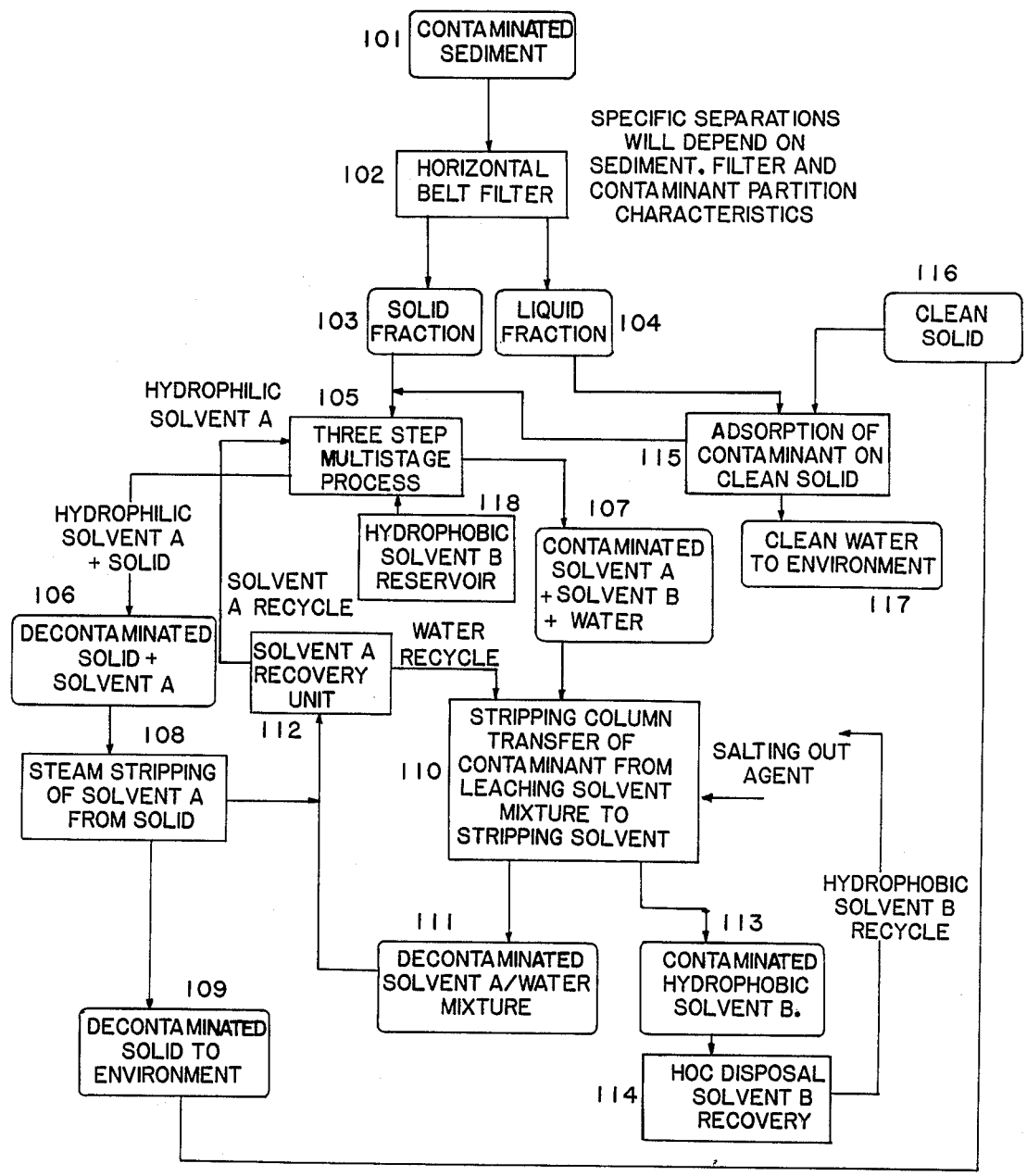
FIG. 2 is a flow chart of another process according to the invention.

In the process, shown in FIG. 2, contaminated sediment is provided at 101. The sediment is fed to a horizontal belt filter at 102 wherein the original composition is broken up into a solid fraction and a liquid fraction 104.

The solid fraction is fed in 105 to a three-step extraction process with a hydrophilic solvent A and hydrophobic solvent B. The hydrophilic solvent A is from the solvent recovery unit 112 while the hydrophobic solvent B is from 118, the solvent B reservoir. As a result of this extraction, decontaminated sediment and solvent A mixture are obtained at 106 and a contaminated solvent A/solvent B mixture is obtained at 107.

The decontaminated sediment and solvent A is steam stripped of the solvent A at 108 so that decontaminated sediment which is able to be released to the environment is obtained at 109. The stripped solvent A is fed to the solvent A recovery unit 112 wherein solvent A is separated from any remaining water, with solvent A being recycled to the multistage countercurrent extraction unit 105 and the water recycled to a stripping column 110 to be described later.

The contaminated solvent A/solvent B/water mixture from 107 is fed to stripping column 110 wherein the contaminant is transferred from the leaching solvent mixture to a stripping solvent. The decontaminated solvent A/water mixture from the stripping column 110 is received at 111 and solvent A and water are separated from each other in the recovery unit 12.

The stripping column 110 receives contaminated mixed solvent and water received from step 107. After the stripping has taken place and the contaminants are concentrated in the stripping solvent, the contaminated solvent B at 113 is sent to a contaminant disposal solvent B recovery unit 114, the contaminant is separated from the solvent B so that the solvent B is recycled to the stripping column 110.

The liquid fraction 104 which only contains trace organic contaminants, is fed to 115 where clean sediment form 109 is provided so that the contaminant is adsorbed on the clean sediment. At 117 clean water is obtained which can be released to the environment. The clean sediment for 115 can be obtained from clean sediment 116 which is in part recycled from the decontaminated sediment in 109. Moreover, the contaminated sediment obtained from step 115 can be fed to the multistage counter-current extraction process step 105 so as to decontaminate the sediment.

The initial separation of the liquid in solid fractions at 102 can be by either filtration, centrifugation or by means of a horizontal belt filter system.

The three step extraction process carried out at 105 can be carried out by the use of a series of mixer-settler type vessels or a continuous countercurrent contactor. The liquid extraction carried out in the stripping column 110 can take place in an agitated extraction tower such as a rotating disk unit. The adsorption of the contaminant on clean sediment at 115 can be carried out in a fixed bed adsorption column or in a multi-stage mixer-settler.

Figure 3:
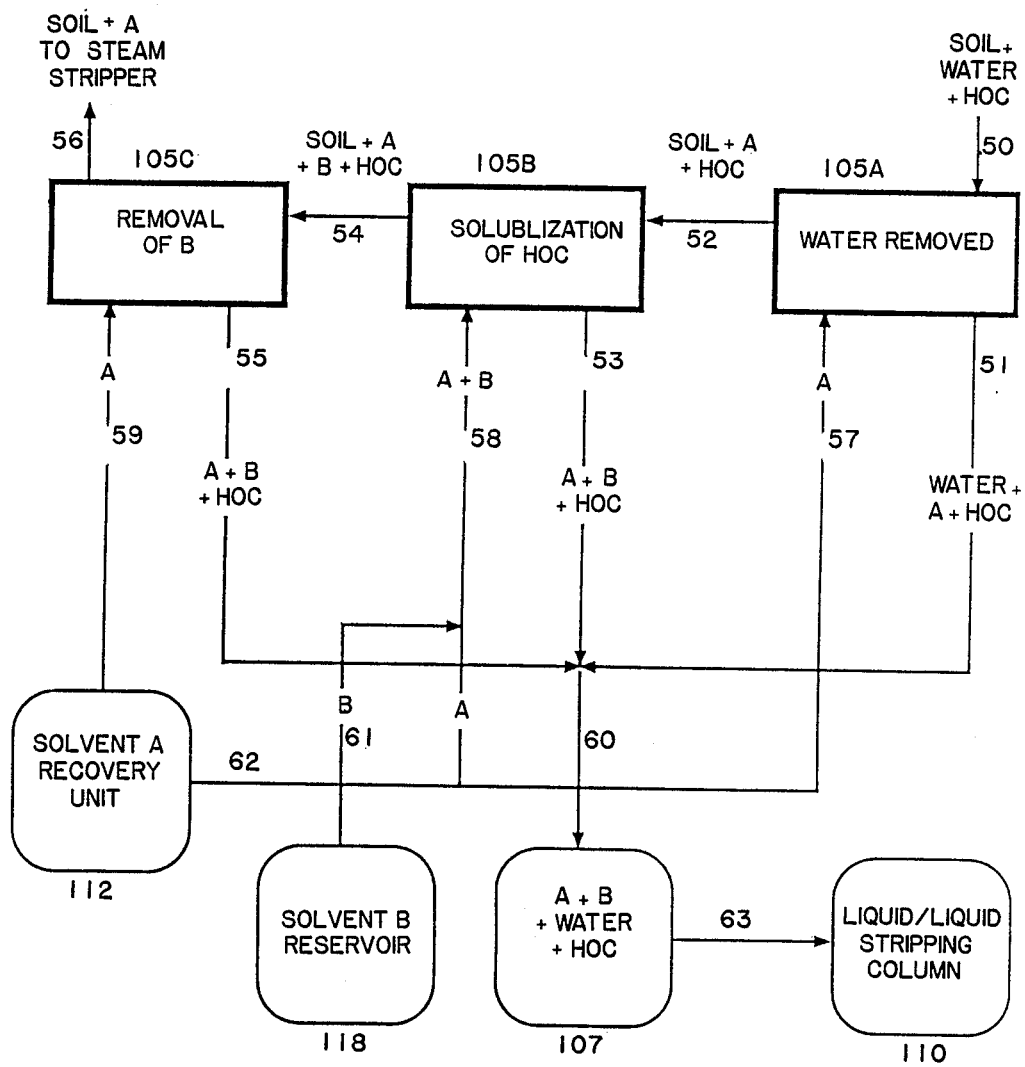
FIGS. 3 and 4 show details of two different embodiments of FIG. 2.

FIG. 3 depicts one embodiment of the process of FIG. 2 in which in process step 105A, the contaminated solid fraction stream 50 flowing from 103 (from FIG. 2) is combined with hydrophilic solvent A from stream 57, which is a part of stream 62 which originates in 112, the solvent A recovery unit. In this step, the hydrophilic solvent exchanges with water in a multistage counter-current mode. The streams leaving 105A are streams 51 and 52. Stream 51 contains most of the water from the original stream 50. Stream 52 contains the HOC contaminated soil and solvent A, and is essentially water free.

Stream 52 is introduced into 105B, the second step in the improved process. To this is added in stream 58 a mixture of hydrophilic solvent A, part of stream 62 which originates in 112, the solvent A recovery unit, and hydrophobic solvent B from stream 61 originating in 118, the solvent B reservoir. The addition of solvent B, selected for its high solubilization power of the specific HOC, will allow complete disassociation of the HOC from the solid substrate, effectively permitting the leaching and thus the removal of the HOC from the solid substrate. Streams leaving 105B are 53 and 54. Stream 53 contains solvents A and B with most of the HOC and stream 54 contains soil solids, solvents A and B and the remaining HOC. Step 105B is a multistage countercurrent process in which the number of stages required is determined by the degree to which the solids need to be decontaminated in this step.

Stream 54 is introduced into 105C, the third step of the improved process. To this is added stream 59, solvent A which originates from 112, the solvent A recovery unit. Solvent A which is completely miscible with solvent B in the absence of water, is used to completely remove solvent B and trace HOC from the soil or sediment. Step 105C is a countercurrent multi-stage leaching. The number of stages required is determined by the degree to which the soil or sediment must be decontaminated from solvent B and HOC, for safe disposal of the soil or sediment. Streams leaving are 56 and 55. Stream 56 contains solid and solvent A, which then goes to the steam stripper 108 (refer to FIG. 2) and stream 55 contains solvents A and B with all the residual HOC. Streams 55, 53 and 51 are combined to stream 60 in 107, which then via stream 63 is introduced to 110, the liquid/liquid stripping column.

Figure 4:
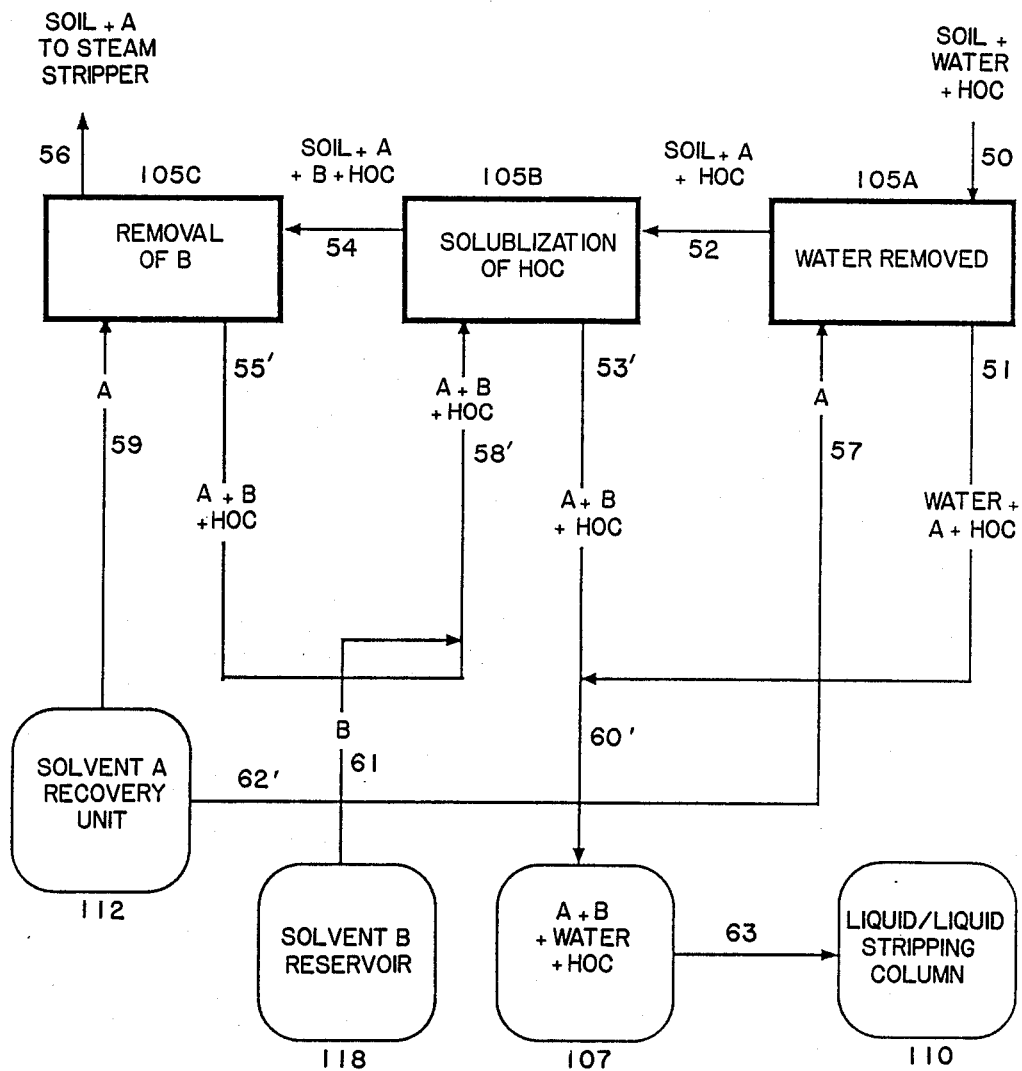

FIG. 4 is another embodiment of the process of FIG. 2 in which an internal solvent recycle loop is used cutting down on the amount of solvent A required. The process is different from the process in FIG. 3 in that the discharge solvent stream 55' from 105C is combined with stream 61 from the solvent B reservoir 118 to introduce stream 58' as a solvent recycle loop into 105B. The discharge from 105B is the 53' which combines with 51 to form stream 60', which then goes to 107 for further processing as in FIGS. 2 and 3.

Figure 5:
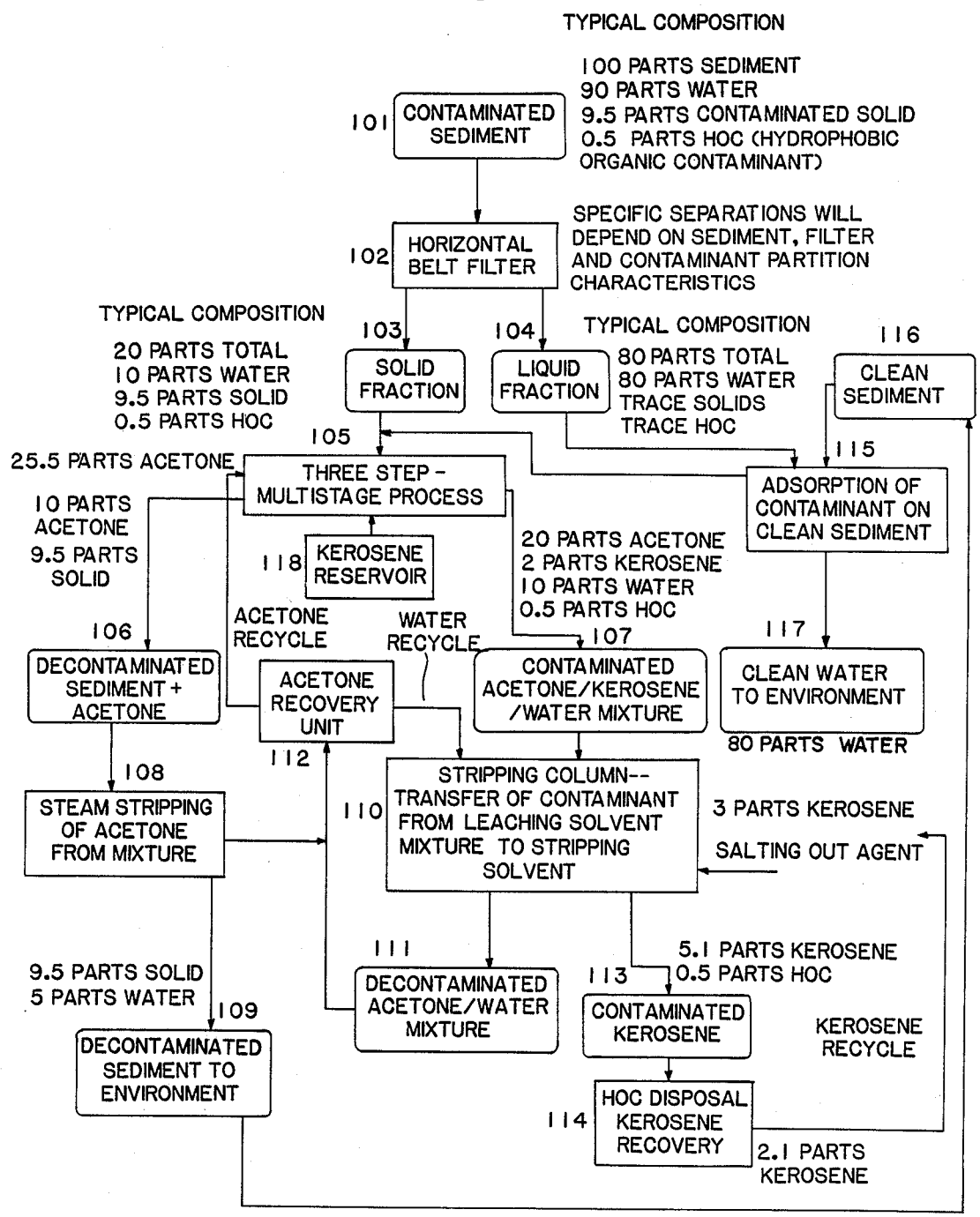
Figure 6:
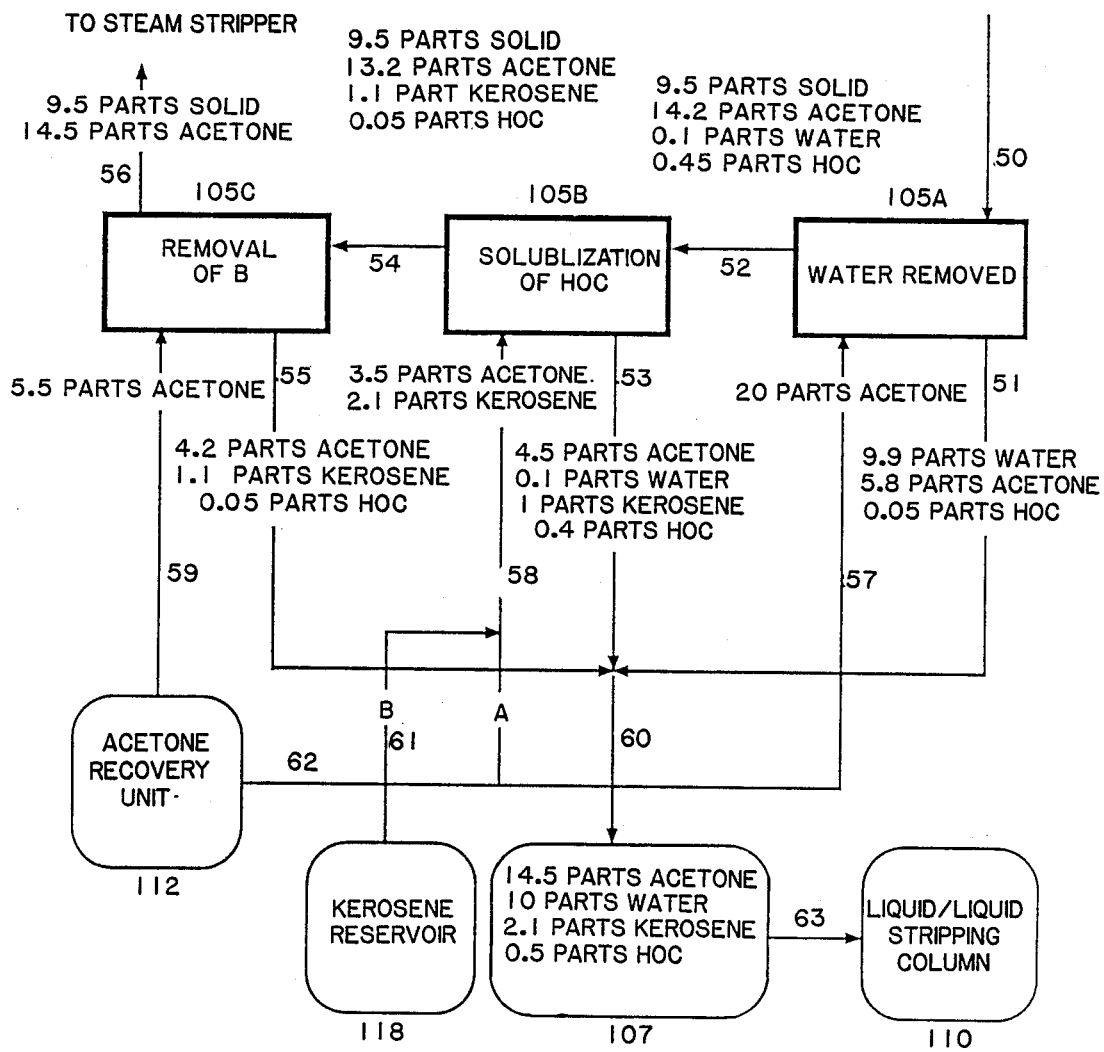

FIG. 5 is a specific embodiment of the improved process depicted in FIG. 2 in which a typical waste composition is 100 parts sediment consisting of 90 parts water, 9.5 parts contaminated solid and 0.5 parts HOC. Solvent A is acetone and solvent B is kerosene. FIGS. 6 and 7 are specific examples of the two embodiments depicted in FIGS. 3 and 4 respectively for the same waste composition as in FIG. 5 and in which solvent A is acetone and solvent B is kerosene.

It will be appreciated that the instant specification and claims are set forth by way of illustration and not limitation, and that various modifications and changes may be made without departing from the spirit and scope of the present invention.

What is claimed is:

1. A process for the decontamination of solid materials contaminated with hydrophobic organic compounds, the process comprising the steps of:
   a. providing a mixture of solids with water and contaminant including hydrophobic organic compounds;
   b. leaching the solids with solvents to obtain contaminated solvent and water and a mixture of decontaminated solids and solvent by:
      i. removing water from the mixture of step (a) with a hydrophilic solvent to obtain a first liquid steam of water, hydrophilic solvent and contaminant and a first solid steam of solids, hydrophilic solvent and contamininant;
      ii. removing contaminant form the first solid steam with a comixture of the hydrophilic solvent and a hydrophobic solvent to obtain a second liquid steam of the two solvents and contaminant and a second solid steam of the solids, the two solvents and the remaining contaminant, and
      iii. removing hydrophobic solvent and remaining contaminant from the second solid steam with hydrophilic solvent to obtain a third liquid steam of the two solvents and the remaining contaminant and a decontaminated third solid steam of solids and hydrophilic solvent;
   c. stripping contaminant from at least two of the liquid steams with the hydrophobic solvent to obtain an output of decontaminated hydrophilic solvent and an output of hydrophobic solvent and concentrated contaminant; and
   d. stripping the hydrophilic solvent from the third solid steam to obtain decontaminated solids and decontaminated hydrophilic solvent.

2. The process according to claim 1, wherein step (d) comprises stripping contaminant from all three liquid streams.

3. The process according to claim 1, wherein the third liquid stream is used to supply the comixture of solvents to remove contaminant from the first solid stream.

4. The process according to claim 1, further comprising:
   (e) recycling hydrophilic solvent from the stripping step (c) and step (d) into the leaching step (b).

5. The process according to claim 1, further comprising:
   (f) separating the contaminant from the hydrophobic solvent of step (c) to produce decontaminated hydrophobic solvent; and
   (g) recycling the decontaminated hydrophobic solvent of step (f) to the stripping step (c).

6. The process according to claim 1, wherein each portion of step (b) is a multistage process.

7. The process according to claim 1, wherein the hydrophilic solvent comprises a solvent, which has a boiling point lower than water and is completely miscible with water.

8. The process according to claim 1, wherein the step (c) of stripping comprises contacting the contaminated solvent in a liquid-liquid extractor with the hydrophobic solvent and an aqueous solution of potassium sulfate.

9. A process according to claim 1, wherein the mass ratio of solvent to solids is 0.5 to 15.

10. A process according to claim 1, wherein the mass ratio of solvent to solids is 0.5 to 5.

* * * * *